US011925979B2

(12) United States Patent
Prabhu et al.

(10) Patent No.: US 11,925,979 B2
(45) Date of Patent: Mar. 12, 2024

(54) CONTROLLED CASTING OF IN-MOLD LARGE STEEL INGOT WITH INDUCED VARIABLE POWER AND VARIABLE FREQUENCY APPLIED TO THE TOP SURFACE OF MOLTEN METAL IN-MOLD

(71) Applicant: INDUCTOTHERM CORP., Rancocas, NJ (US)

(72) Inventors: Satyen N. Prabhu, Voorhees, NJ (US); Mike Maochang Cao, Escondido, CA (US); Nier Wu, Mt. Laurel, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 17/531,381

(22) Filed: Nov. 19, 2021

(65) Prior Publication Data
US 2022/0161318 A1 May 26, 2022

Related U.S. Application Data

(60) Provisional application No. 63/116,455, filed on Nov. 20, 2020.

(51) Int. Cl.
*B22D 27/02* (2006.01)
*B22D 7/00* (2006.01)
*B22D 46/00* (2006.01)

(52) U.S. Cl.
CPC .............. *B22D 27/02* (2013.01); *B22D 7/00* (2013.01); *B22D 46/00* (2013.01)

(58) Field of Classification Search
CPC . B22D 7/00; B22D 7/10; B22D 7/106; B22D 9/00; B22D 9/006; B22D 27/02; B22D 46/00
USPC .......... 164/48, 492, 493, 250.1, 513
See application file for complete search history.

(56) References Cited

U.S. PATENT DOCUMENTS

2011/0011750 A1  1/2011  Lovens et al.
2017/0022082 A1  1/2017  Prabhu et al.

FOREIGN PATENT DOCUMENTS

| CN | 205437109 U | * | 8/2016 | ............. B22D 27/02 |
| KR | 20010017222 A | | 3/2001 | |
| KR | 20110046668 A | | 5/2011 | |
| KR | 101219608 B1 | | 1/2013 | |
| KR | 10-2123914 B1 | | 6/2020 | |

OTHER PUBLICATIONS

Machine translation of CN 205437109 U (Year: 2016).*

* cited by examiner

*Primary Examiner* — Kevin P Kerns
(74) *Attorney, Agent, or Firm* — Philip O. Post; Robert J. Everling

(57) ABSTRACT

Large steel ingot casting is accomplished with a top suspended induction heating device supplied with variable power and variable frequency from a power source. By the induction heating and stirring provided by the top suspended induction heating device, metal solidification advances progressively upwards from bottom to top, and the upper molten metal in a riser part compensates for shrinkage of the lower solidified metal in the main part. Inclusions are selectively moved out of the molten metal by a variable electromagnetic stirring force and the formation of casting defects is suppressed.

20 Claims, 10 Drawing Sheets

G2.3

G2.4

G3.1

G3.2

CONTROLLED CASTING OF IN-MOLD LARGE STEEL INGOT WITH INDUCED VARIABLE POWER AND VARIABLE FREQUENCY APPLIED TO THE TOP SURFACE OF MOLTEN METAL IN-MOLD

CROSS REFERENCE TO RELATED APPLICATIONS

This application claims the benefit of U.S. Provisional Application No. 63/116,455, filed Nov. 20, 2020, hereby incorporated by reference in its entirety.

FIELD OF THE INVENTION

This invention is about large volume metal ingot casting in general and particularly about large volume steel ingot casting, for which a pancake-shaped coil or similar induction heating device is hung over the top surface of molten metal to deliver induced heating power and electromagnetic stirring force into the molten material in the mold. The process of the induction heating and the electromagnetic stirring will delay the material solidification in the part of the mold higher than the solidification line to ensure the molten metal in the upper part cooled and solidified slower than that in the lower part. The general objectives are to ensure the metal solidification advances upwards from bottom to top progressively so that the upper molten metal compensates the shrinkage of the lower solidified metal and selective defects are moved out by stirring force with a variable power and a variable frequency supplied to the induction heating device. The benefits of this technique is to reduce casting defects and improve final ingot products' quality.

BACKGROUND OF THE INVENTION

Casting large volume steel ingots demands a considerable long time due to the substantial large volume of molten material in the mold. Correspondingly, significant shrinkage may arise in the ingot during the solidification process, and it will bring great structural defects and deteriorate the quality of the casting products eventually. Consequently, appropriately designed casting approaches to primarily optimize the solidification process is desired.

The typical casting process for large volume steel ingot includes pouring molten material into the mold and cooling the molten metal until it is solidified completely. This process regularly requests a space of a riser, an extra void in the mold that fills with molten material to compensate for shrinkage during solidification. When steel is poured into the ingot mold, progressive solidification starts from the walls and the base of the mold, moving inwards towards the thermal center or axis. The liquid steel decreases in volume during and after solidification and there will be insufficient solid metal to fill the shell first formed if the molten material in the riser is solidified earlier or at the same pace as the material in the main part of mold. The result is a body of steel with cavitation especially in the region of the last metal to solidify. Such cavitation is also associated with impurities, which concentrate, by segregation forming an undesirable distribution of undesirable elements in the final product.

Conventionally, there is a variety of approaches that have been adapted to maintain the material in the riser in the molten state until the metal in the ingot mold main part has solidified entirely. It is based on the perception that keeping the molten metal progressively solidifying upward from the bottom to top is crucial to the quality of the final products.

The Korea Patent No. KR10 2123914B1 (hereinafter referred to as KR Patent '914) discloses a steel ingot casting technique employing an electric induction heating device of pancake-shape with inside coil disposed in spiral form and grouted by refractory, which is mounted and hung over the top of the mold. The ingot casting procedure using this technique comprises four steps: the first step is pouring molten steel into the mold, for example, through a bottom entrance; the second step is adding heat generating material and thermal insulating material on the top surface of the molten steel in the mold; the third step is lowering the induction heating device to the required location adjacent to the top surface of molten metal; and the fourth step is applying an alternating current of specified frequency to the coil to heat up the metal until it is entirely solidified. The benefit of this technique is by maintaining the upper part of the metal molten to ensure the solidification advances upward from bottom to top progressively. Hence, the upper molten metal will compensate the shrinkage of the lower solidified metal and reduce the structural defects.

In KR Patent '914, the overhung induction heating device along with provided heating agent (material) and thermal insulating agent (material) are intended to maintain the metal in the upper part of the mold molten, which is crucial to eliminating the internal defects of the final products. The structural defects of final products include macro-segregation, shrinkage porosity and inclusion. In terms of eliminating inclusion, the benefits of induction heating are managing the solidification direction and controlling the entire solidification time.

If the application is steel casting, nonmetallic inclusions will be classified as indigenous inclusion and exogenous inclusion by their sources. Indigenous inclusions are deoxidation products or precipitate formed during cooling and solidification processes. For example, nonmetallic matters entrapped by growing dendrites. Exogenous inclusions arise from unintended chemical and mechanical reactions between molten steel and its environments, which will lead to ingot defects such as porosity and pinholes. Some non-metallic inclusions tend to flow into the upper part of molten metal and be trapped in the slag and can be disposed of by cutting off from the final product in the end. The scrapped cut-off is unusable, and it usually takes on 13 to 15 percent of the final product.

There is a constant demand for clean steels, that are the materials free of defects and are used in challenging applications such as automotive parts and components used in corrosive environments.

One objective of the present invention is to further reduce the defects in casting ingot products by coordinately varying induced power and frequency supplied to the overhung induction heating device.

BRIEF SUMMARY OF THE INVENTION

In one aspect, the present invention comprises a system and a method dedicated to large ingot mold casting applications, in which an electric induction heating device is employed to maintain the upper portion of metal molten and the solidification process advances upward from bottom to top progressively by inducing thermal energy and electromagnetic stirring force into the casting metal through an induction heating coil supplied with alternating current from a power source having a variable power and a variable frequency output. The advantage of maintaining the upper part of the casting metal molten and employing electromagnetic stirring force is substantially reduced structural defects and improved quality of final ingot products.

In another aspect the present invention comprises an induction heating device mounted and suspended over the top of the casting mold and a power source having a variable power and a variable frequency output providing electrical power to the induction heating device to heat up the molten steel in the casting mold for ingot production. The induction heating device comprises: an induction coil; a refractory for embedding the induction coil within it to secure the coil and reduce heat dissipation from the molten metal; and a hoisting device for raising or lowering the induction coil. The power source is configured to provide alternating current with a range of different frequencies and power rates, which best matches the requirements of heating energy and stirring force from the solidification process to reduce the casting defects.

In another aspect the present invention is an ingot product method employing an induction heating device hanging over a casting mold where a variable power and a variable frequency power source supplies power to the induction heating device. The ingot casting process employing this technique comprises four steps: the first step is pouring molten steel into the mold by a bottom entrance; the second step is adding heat generating and thermal insulating material on the top surface of the molten steel in the mold; the third step is lowering the induction heating device to location for preheating the refractory of the induction heating device to a refractory preheat temperature; and the fourth step is applying an alternating current with a molten metal heating frequency from the variable power and variable frequency power source to the coil to heat up the casting metal while maintaining the upper part of the metal molten when the solidification starts from the bottom upwards progressively and accelerating the moving out of inclusions by increasing electromagnetic stirring speed by control of the variable frequency output from the variable power and variable frequency power source.

For certain applications of this method, the cavity of the ingot mold can be divided into a main part and a riser part. During the fourth step introduced above, the heating up process may be started at the moment the solidification in the main part is completely finished and the metal in the riser is still molten.

In another aspect the present invention comprises a top induction heater which is mounted and suspended over the top of the casting mold and a power source having a variable power and a variable frequency output which provides electric power to the induction heater. The top induction heater and the power source are configured for metal ingot production. The top induction heater is configured as a pancake-shaped refractory embedding an induction coil which is disposed in a spiral shape. Inside the pancake-shaped refractory, the induction coil is grouted and cerack wool (cerakwool), insulating power and castable cement are used to cover grouted coil from inside to outside layer by layer. These structures form the solid body of the induction heater which can be raised or lowered by the hoisting equipment.

The above embodiments of the present invention are particularly applicable to retrofit existing ingot molds since the electric induction heating device is positioned over the top of the melt surface. However the invention is not limited to retrofit applications.

The above and other aspects of the present invention are set forth in this specification and the appended claims.

BRIEF DESCRIPTION OF THE DRAWINGS

The drawings, as briefly summarized below, are provided for exemplary understanding of the invention, and do not limit the invention as further set forth in this specification and the appended claims.

DETAILED DESCRIPTION OF THE INVENTION

A "large" steel cast ingot is defined herein as an ingot having a cross section with at least 0.10 square meters area and of round, square, rectangular, or other shape.

Figure 1:
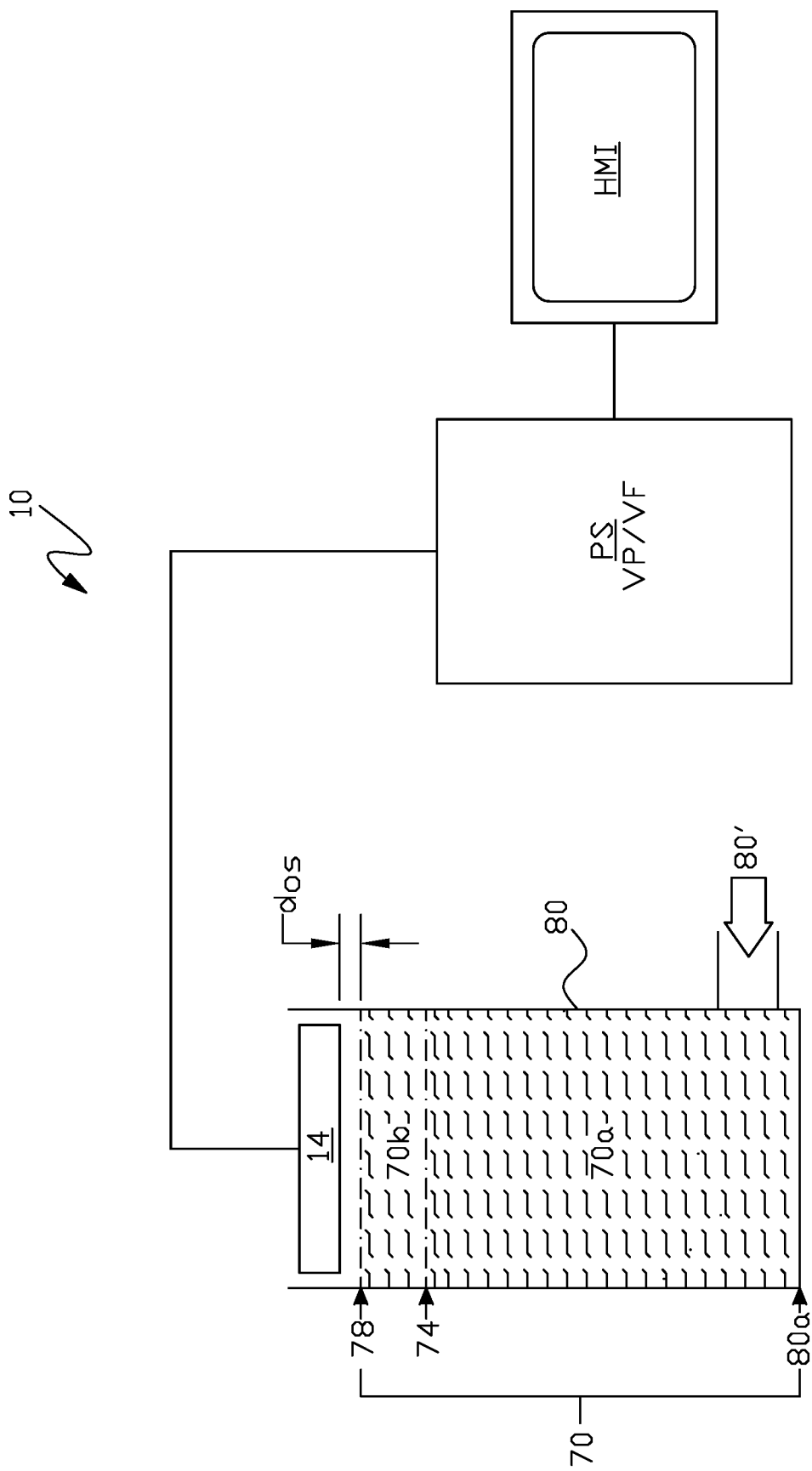
FIG. 1 is a simplified diagrammatic representation of one embodiment of a molten steel ingot casting system of the present invention.

FIG. 1 illustrates one embodiment of system 10 of the present invention for producing a large steel ingot by solidifying a molten steel in a casting mold. In FIG. 1 casting mold 80 is filled with molten steel via bottom mold entry 80' and an electric induction heating device 14 is positioned over the top of casting mold 80. Molten steel (also referred to as the "melt") is poured through the bottom mold entry to melt fill height 78. In other embodiments of the invention a top pour casting mold is used. When casting mold 80 is filled to melt fill height 78 with molten steel, directional solidification of the molten steel begins to form the final steel ingot product. Molten steel 70 in the casting mold (from mold bottom 80a to melt fill height 78 is designated main part 70a and riser part 70*b*. In this diagrammatic representation riser part begins at casting mold height 74 and ends at the melt fill height 78. The size of riser part 70*b* can be determined by one skilled in the art given the size of the large steel ingot and solidification process parameters for a particular application.

A first step in the process is determining the magnitude of induced power to the molten steel in the mold. In one embodiment of the present invention an initial value of induced power is selected as 10 kW per square meters of the top surface area of the molten steel in the casting mold.

In alternative embodiments of the invention electric induction heating device 14 comprises an electric induction heating coil; a flat spirally-wound induction heating coil; or an electric induction heating coil at least partially encased in a refractory. KR Patent '914 discloses a pancake-shaped heating coil encased in a refractory as one example of an electric induction heating device suitable for the present invention. Preferably the coil or coils are configured to be initially placed adjacent to the top surface area of the molten steel in the casting mold at the melt fill height 78.

The offset distance indicated as $d_{os}$ in FIG. 1 is the distance between the top surface area of the molten steel to the bottom of induction heating device 14. Electric induction heating device 14 can be moveably mounted above the top surface area of the molten steel via a suitable raising and lowering apparatus as known in the art. KR Patent '914 discloses a lifting-lowering device for raising or lowering a pancake-shaped heating device as one example of a raising and lowering apparatus suitable for the present invention. In some embodiments of the invention distance $d_{os}$ is changed during the directional solidification of the molten metal forming the large steel ingot by raising or lowering the induction heating device. When the bottom of the induction heating device is moved closer to the melt surface, the electric efficiency is increased for a given power to the melt which results in total power, voltage and current being reduced from the output of a variable power and variable frequency (VP/VF) power supply PS while the electromagnetic repelling force stays the same since the Lorentz force is proportional to the power to melt.

In some embodiments of the invention, the casting mold has a top mold section, which covers the bottom mold section containing the molten steel to form an entirely enclosed interior mold volume and the induction heating device is positioned relative the top mold section to supply induced heat during directional solidification of the large steel ingot.

Figure 2A:
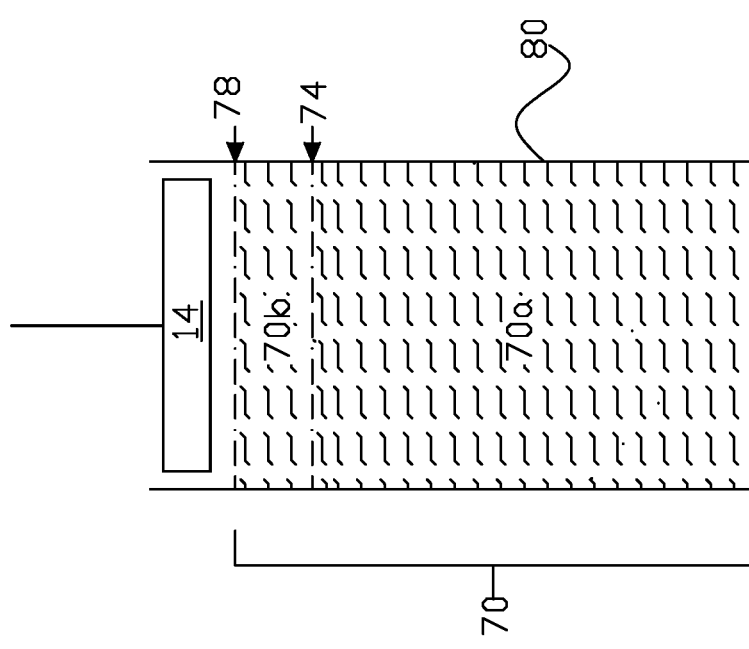
FIG. 2(a) is a diagrammatic representation of a large casting mold filled with molten steel at the start of directional solidification.

Molten steel 70 in casting mold 80 is diagrammatically shown at melt fill height 78 in FIG. 1 at the start of the directional solidification process. After directional solidification of all molten metal has completed a final solidified large steel ingot 90 as shown in FIG. 2(*c*).

Variable power magnitude and variable frequency is supplied from VP/VF power source PS shown in FIG. 1. In some embodiments of the invention variable power is provided by varying voltage magnitude output from the VP/VF power source PS, for example, from a variable voltage output controller associated with the VP/VF power source PS. In other embodiments of invention variable power is provided by varying a combination of voltage magnitude and current magnitude outputs from VP/VF power source PS, for example, from a variable voltage and current output controller associated with the VP/VF power source PS.

The variable frequency, voltage, and current values of alternating electric current that are supplied from VP/VF power source PS to induction heating device 14 are determined by a particular directional solidification process duration and the particular directional solidification process duration is further determined by the size and shape of the ingot, and chemical composition of the casting material. Process controlling parameters are selected to ensure that the molten metal in the riser part 70*b* will not start to solidify until after the directional solidification process in the main part 70*a* is completely finished in forming the main ingot part.

In some embodiments of the invention the variable frequency is selected to control reference depth of penetrated current into the molten steel so that the reference depth of penetrated current stays within the riser part 70*b*. With the reference depth of current limited to the riser part, molten steel is kept in the molten state in the riser part with heat generated in the riser part being transferred to the main part by conduction and convection to assure directional solidification in the main part.

In some embodiments of the invention the variable frequency output from power source PS is selected to inhibit casting defects from arising in the main part 70*a* directional solidification with the frequency selected to form a particular type of electromagnetic stir pattern and speed depending upon the type of casting defects.

In some embodiments of the invention a Human Machine Interface can be utilized for storing the variable power output values and the variable frequency output values of the electric power source for a future large ingot casting process. In some embodiments of the invention real time ingot directional solidification process control with the VP/VF power supply PS to the induction coil in induction heating device 14 for a given casting mold and steel alloy casting formula used to construct parametric models of process power and frequency control for future ingot casting in the same casting mold with the same alloy casting formula can be stored in a memory unit of a Human Machine Interface (HMI) for future ingot castings.

In some embodiments of the invention, the control parameters of the directional solidification process for a given casting mold and steel alloy type can be stored in a suitable electronic device such as a solid state memory component in a Human Machine Interface (HMI) shown in FIG. 1 for future use. The power rate and frequency, and the established control parameters, can be fixed as a formulation by a casting process software executing in a system processor in the HMI and stored in the solid state memory component of the HMI for further use of the formulation.

FIG. 3(*a*) through FIG. 6(*b*) illustrate parametric models for four examples of the present invention for controlled casting with in-mold large steel ingot casting with induced variable power and variable frequency applied to the top surface area of molten metal in the model.

The upper half of each FIG. 3(*a*) though FIG. 6(*a*) plots typical parametric relationships between power source variable output voltage magnitude (righthand vertical axis values) and variable current magnitude (left hand vertical axis values) with variable frequency values being referenced in the horizontal axis.

The lower half of each figure plots typical parametric relationships between electromagnetic repelling force (righthand vertical axis values) and melt speed (left hand vertical axis values) with variable frequency values being the horizontal axis.

Figure 2B:
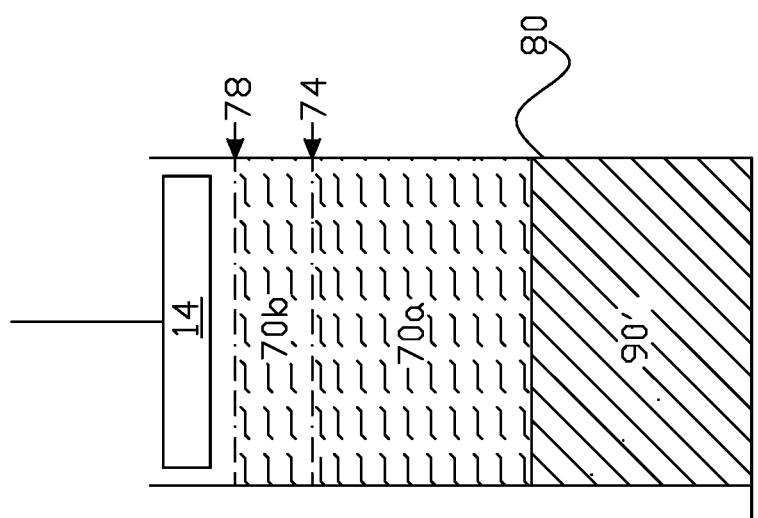
FIG. 2(b) is a diagrammatic representation of when half of the main body of molten steel has solidified.

The term "Before Solidification" in a graph refers to parameters that apply when a mold has been filled with molten metal and all of the steel in a mold is in the molten state as diagrammatically represented in FIG. 2(*a*) until half of the molten metal has solidified (90') as represented in FIG. 2(b). The term "Half Solidification" in a graph refers to parameters that apply after half solidified main ingot part 90' has formed until complete main ingot part and riser ingot part has formed.

EXAMPLE 1

Figure 3A:
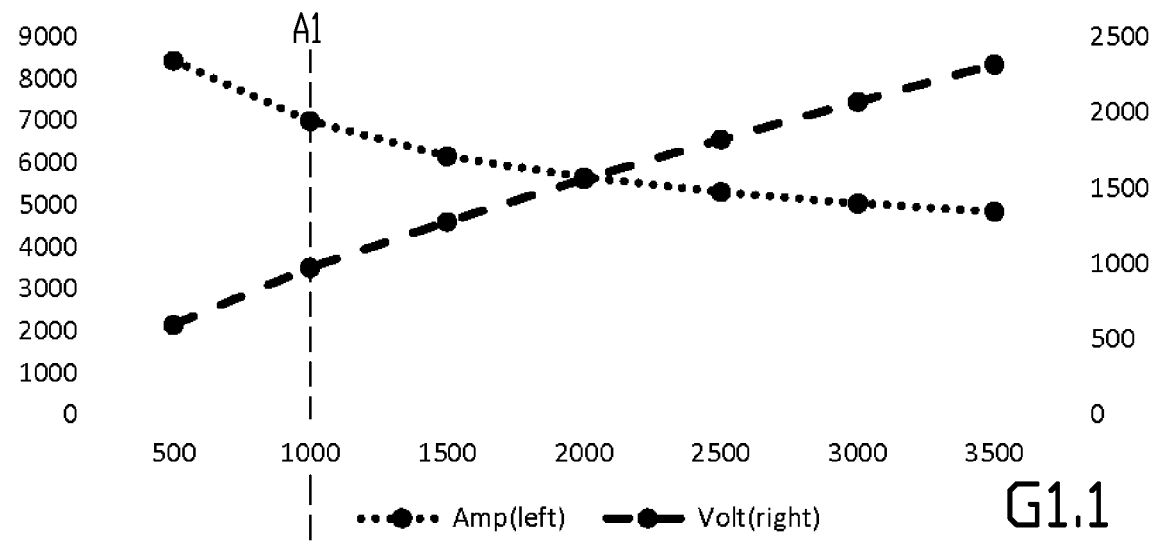
FIG. 3(a) and FIG. 3(b) are parametric models of a coordinately selectable range of voltage and current (power) values and frequency values as outputs from a variable power and variable frequency power source to an electric induction heating coil in one example of the present invention in producing a large steel 100 metric ton ingot with a nominal 250 kW induced power from the power source.
Figure 3A:
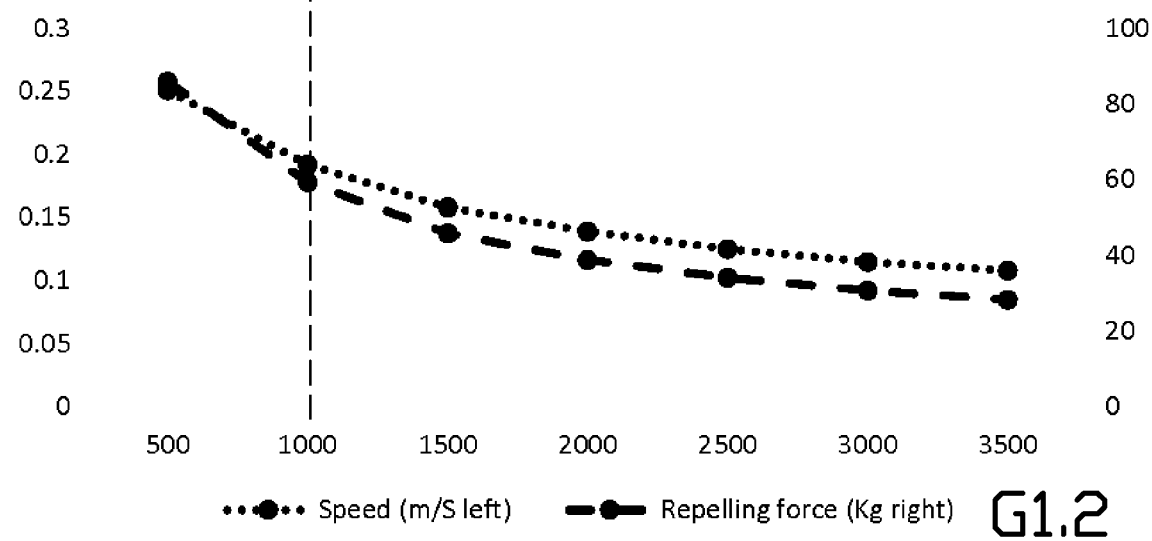
Figure 3B:
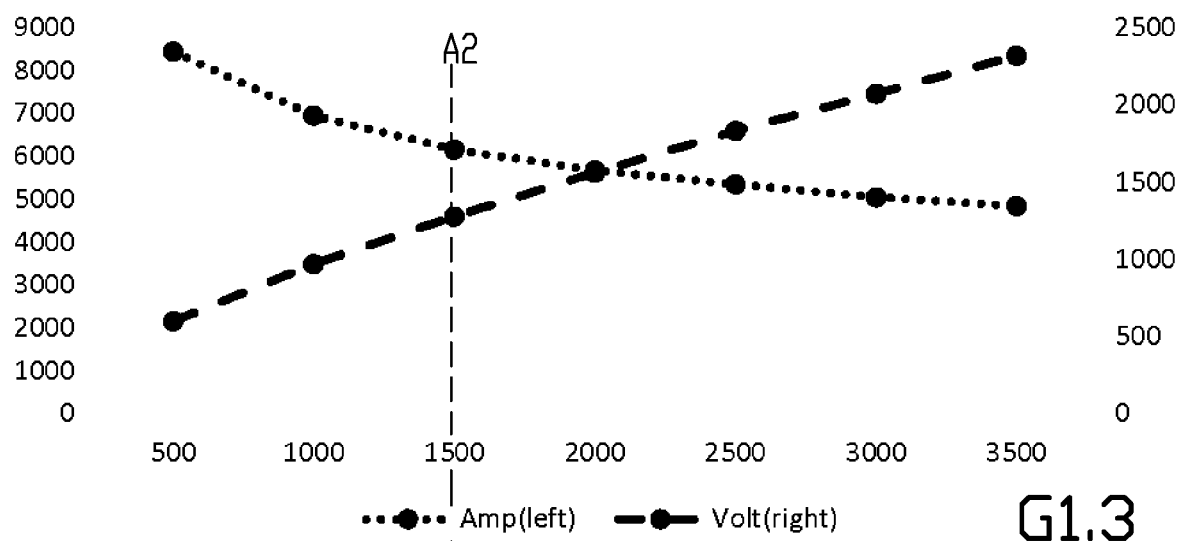
Figure 3B:
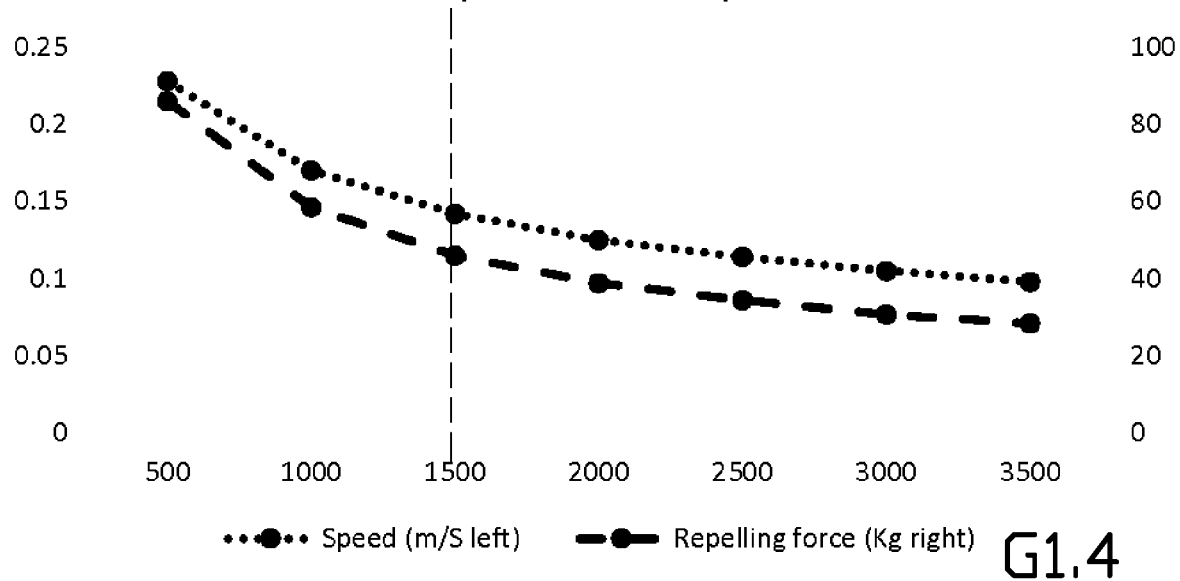

Example 1 is illustrated graphically in FIG. 3(a) and FIG. 3(b) for a 100 metric ton (mt) steel ingot casting where the magnitude of power induced over the top surface of the riser melt part 70b from the energized induction coil of the electric induction heating device 14 is maintained at a nominal 250 kW from the start of the directional solidification of the main part 70a after molten steel has filled the mold until the main part 70a and the riser part 70b have been directionally solidified to form the final product ingot.

Graph G1.1 (power parameters) and Graph G1.2 (electromagnetic stir parameters) in FIG. 3(a) apply to an Example 1 ingot solidification process from the start of the directional solidification of the main part 70a after molten steel has filled the mold until the lower half 90' of main part 70a has solidified as illustrated in FIG. 2(b).

Graph G1.3 (power parameters) and Graph G1.4 (electromagnetic stir parameters) in FIG. 3(b) (Half Solidification process curves) apply to an Example 1 ingot solidification process after half of the main part 70a has solidified until the entire ingot has solidified.

For Example 1 in FIG. 3(a) dashed solidification process line A1 was selected for variable power and stirring parameters from the start of the directional solidification of the main part 70a until half the main part has solidified. From process dashed line A1 in FIG. 3(a), VP/VF power supply PS outputs 7,001 amperes at 976 volts at a frequency of 1 kHz resulting in electromagnetic stir characteristics of typical molten steel speed of 0.192 meters per second (m/s) and a Lorentz repelling force of 59.3 kilograms (kg).

For Example 1 in FIG. 3(b) (Half Solidification process curves) dashed solidification process line A2 was selected for variable power and stirring parameters from after half of the main part 70a has solidified until the remainder of the main part 70a and the riser part 70b has solidified. From process dashed line A2 in FIG. 3(b), VP/VF power supply PS outputs are adjusted to 6164.1 amperes at 1.2792 kilovolts (kV) and at a raised frequency of 1.5 kHz resulting in electromagnetic stir characteristics of typical molten steel speed of 0.142 meters per second (m/s) and a Lorentz repelling force of 46 kilograms (kg).

EXAMPLE 2

Figure 4A:
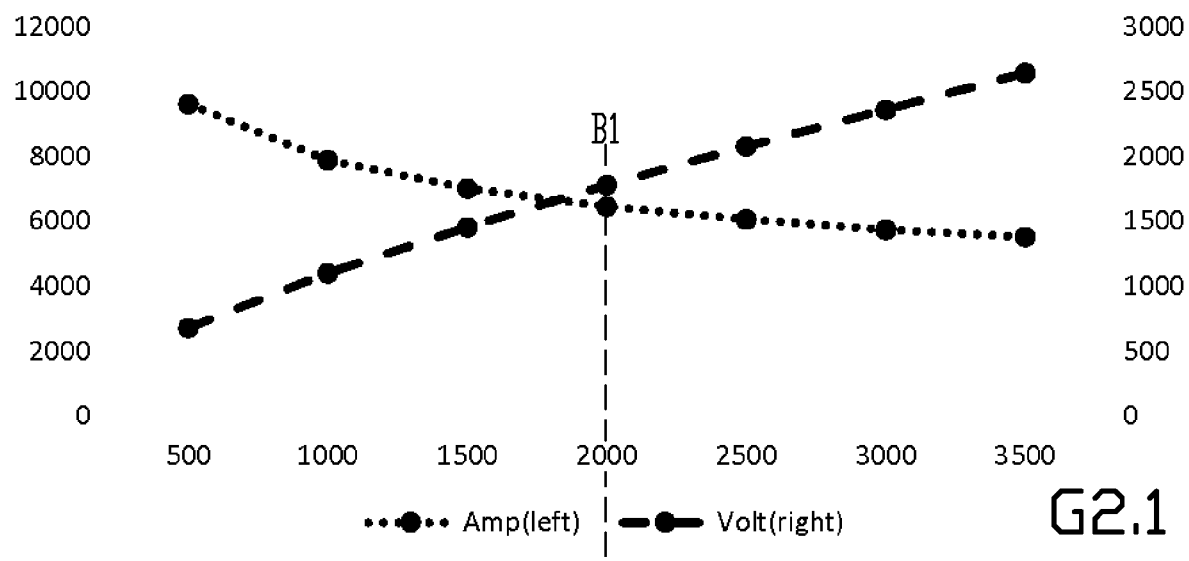
FIG. 4(a) and FIG. 4(b) are parametric models of a coordinately selectable range of voltage and current (power) values and frequency values as outputs from a variable power and variable frequency power source to an electric induction heating coil in one example of the present invention in producing a large steel 100 metric ton ingot with a nominal 325 kW induced power from the power source.
Figure 4A:
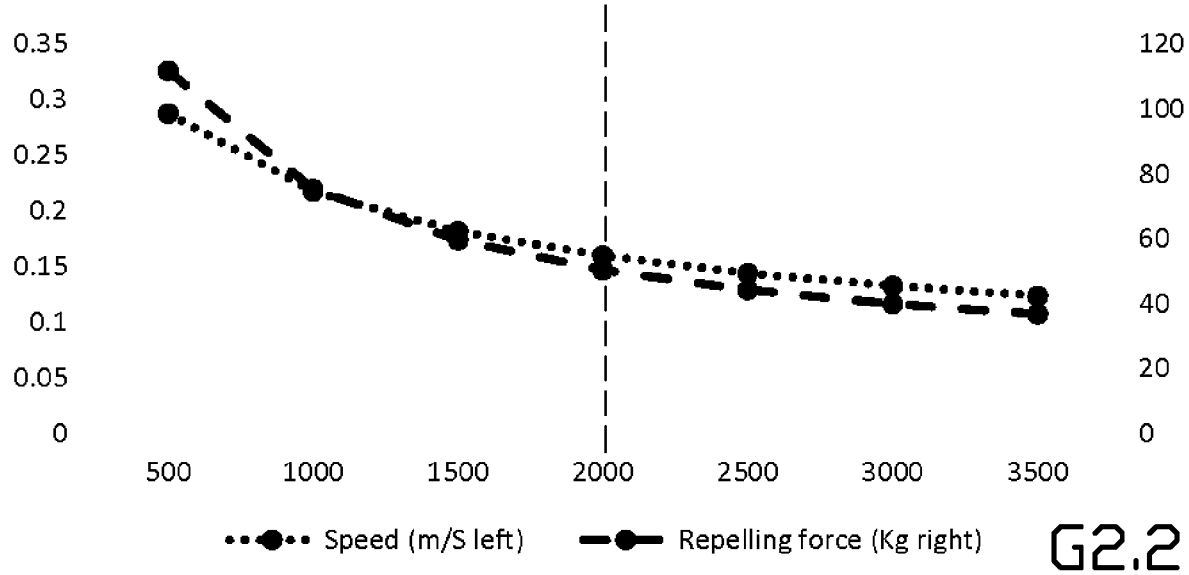
Figure 4B:
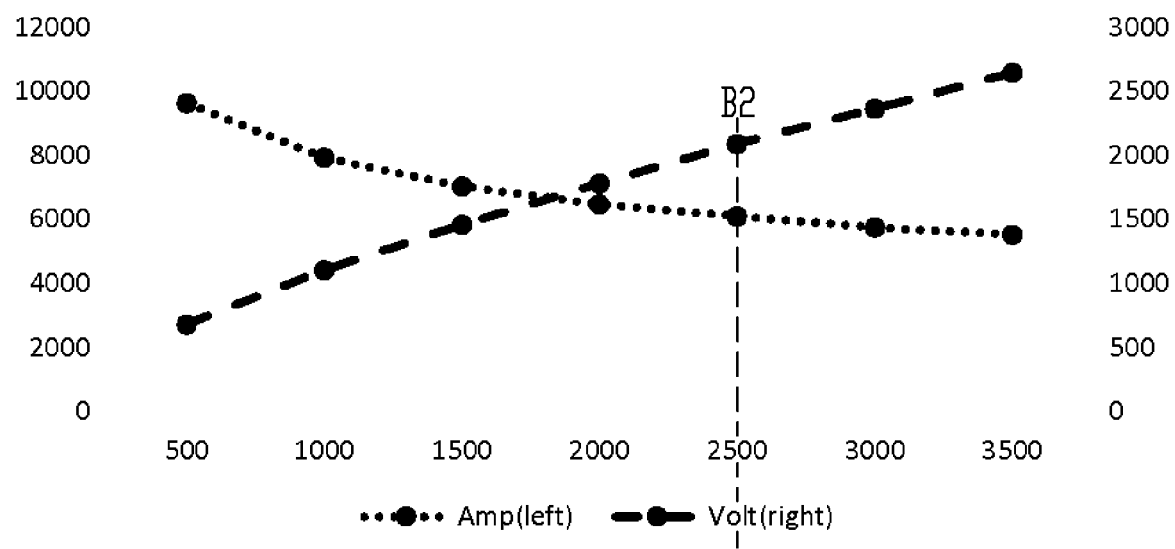
Figure 4B:
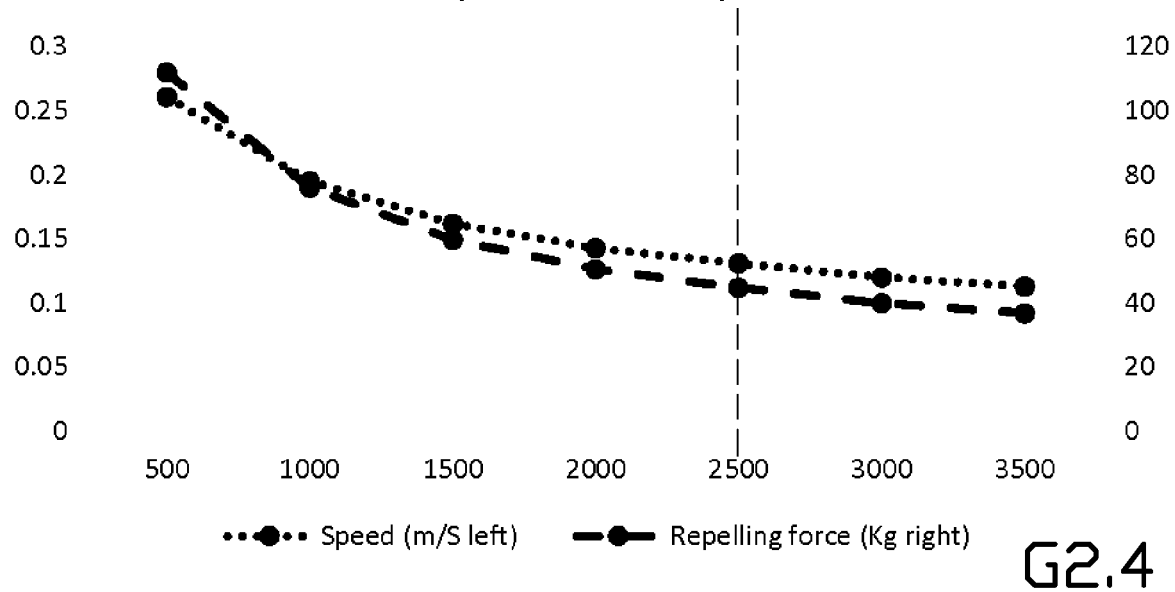

Example 2 is illustrated graphically in FIG. 4(a) and FIG. 4(b) for a 100 mt steel ingot casting where the magnitude of power induced over the top surface of the riser part 70b from the energized induction coil of the electric induction heating device 14 is maintained at a nominal 325 kW from the start of the directional solidification of the main part 70a after molten steel has filled the mold until the main body part 70a and riser part 70b have been directionally solidified to form the final product ingot.

Graph G2.1 (power parameters) and Graph G2.2 (electromagnetic stir parameters) in FIG. 4(a) apply to an Example 2 ingot solidification process from the start of the directional solidification of the main part 70a after molten steel has filled the mold until the lower half 90' of main body part 70a has solidified as illustrated in FIG. 2(b).

Graph G2.3 (power parameters) and Graph G2.4 (electromagnetic stir parameters) in FIG. 4(b) (Half Solidification process curves) apply to an Example 2 ingot solidification process after half of the main body 70a has solidified until the entire ingot has solidified.

For Example 2 in FIG. 4(a) dashed solidification process line B1 was selected for variable power and stirring parameters from the start of the directional solidification of the main part 70a until half main part has solidified. From process dashed line B1 in FIG. 4(a), VP/VF power supply PS outputs are adjusted to 6,460 amperes at 1.779 kV and a frequency of 2 kHz resulting in electromagnetic stir characteristics of typical molten steel speed of 0.16 meters per second (m/s) and a Lorentz repelling force of 50.44 kilograms (kg).

For Example 2 in FIG. 4(b) (Half Solidification process curves) dashed solidification process line B2 was selected until the remainder of the main part 70a and the riser part 70b have solidified. From process dashed line B2 in FIG. 4(b), VP/VF power supply PS outputs are adjusted to 6,093 amperes at 2.091 kV and a frequency of 2.5 kHz resulting in electromagnetic stir characteristics of typical molten steel speed of 0.131 m/s and a Lorentz repelling force of 44.88 kilograms (kg).

EXAMPLE 3

Figure 5A:
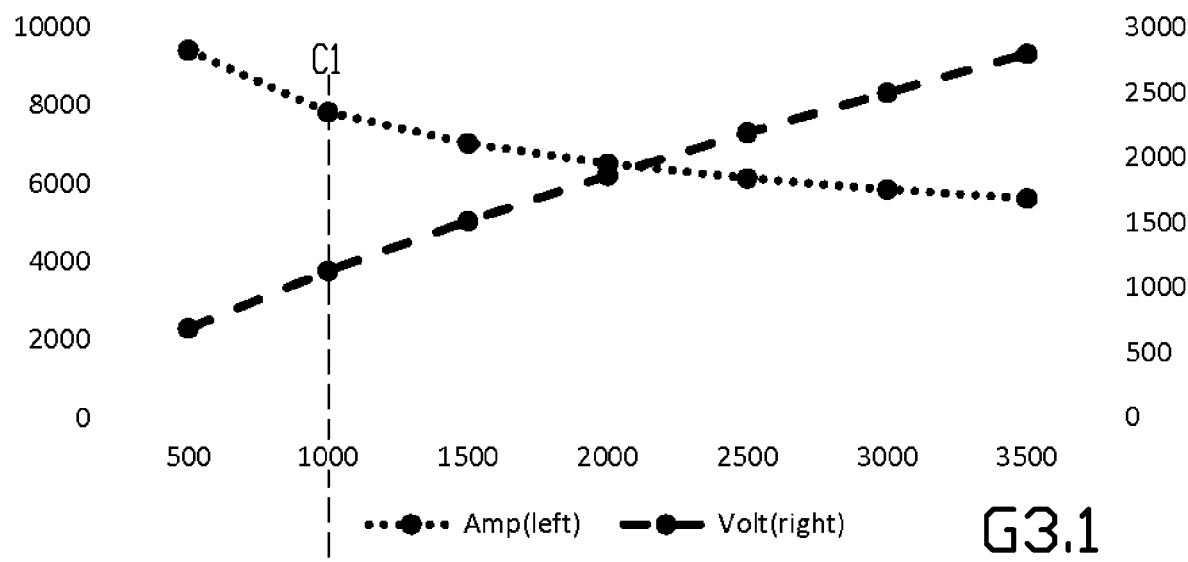
FIG. 5(a) and FIG. 5(b) are parametric models of a coordinately selectable range of voltage and current (power) values and frequency values as outputs from a variable power and variable frequency power source to an electric induction heating coil in one example of the present invention in producing a large steel 150 metric ton ingot with a nominal 250 kW induced power from the power source.
Figure 5A:
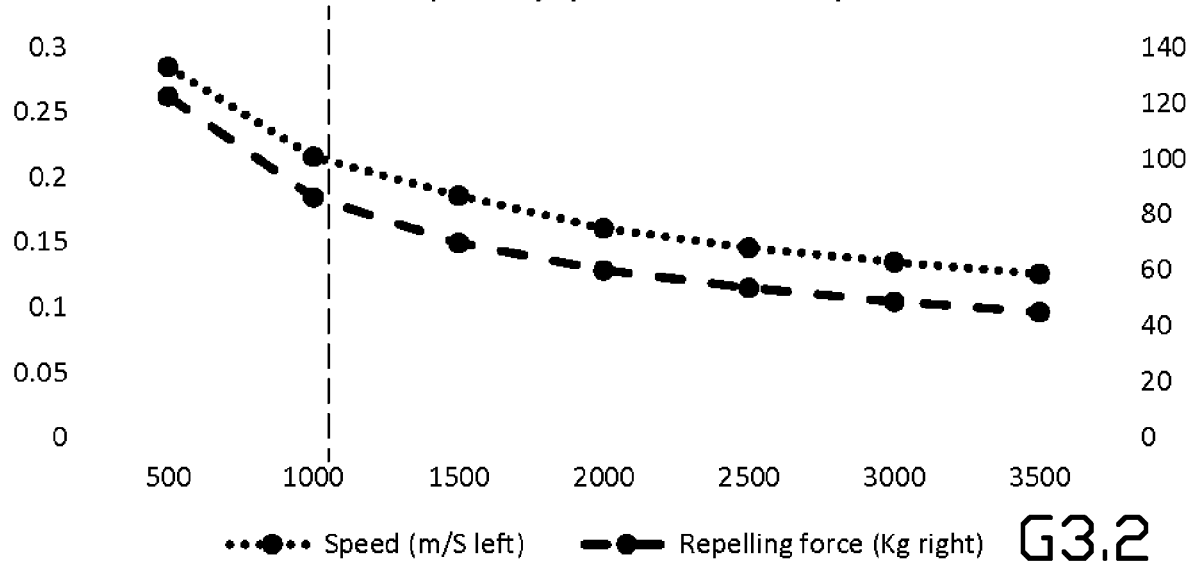
Figure 5B:
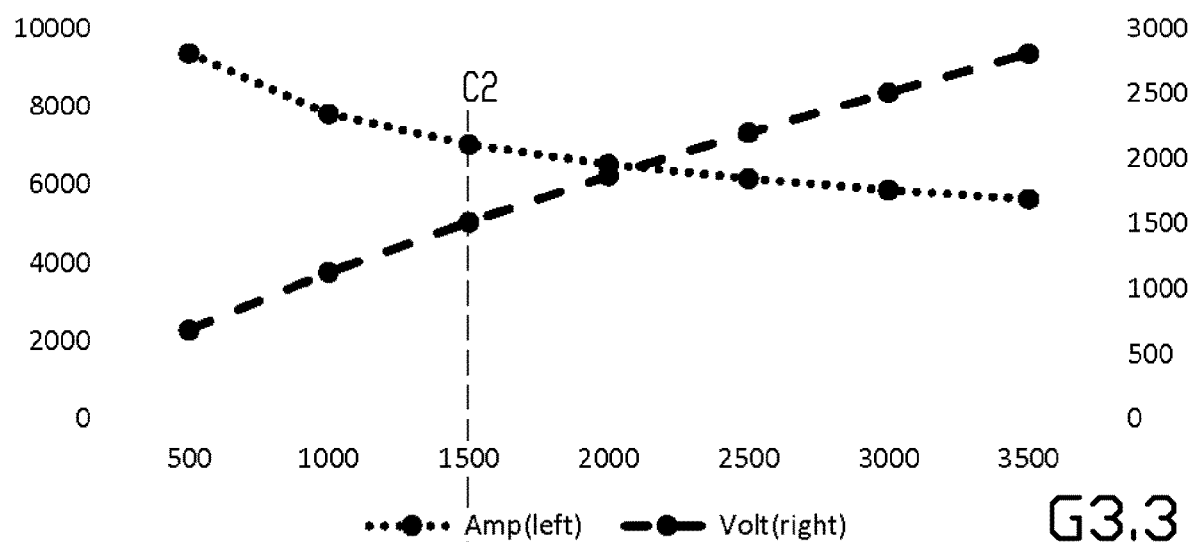
Figure 5B:
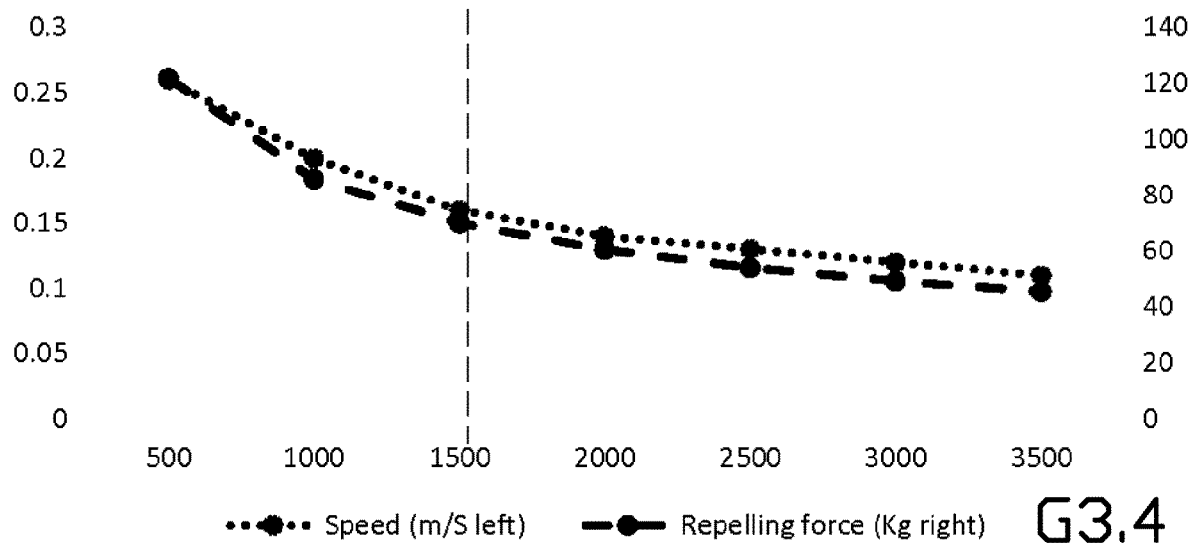

Example 3 is illustrated graphically in FIG. 5(a) and FIG. 5(b) for a 150 mt steel ingot casting where the magnitude of power induced over the top surface of the riser part 70b from the energized induction coil of the electric induction heating device 14 is maintained at a nominal 250 kW from the start of the directional solidification of the main part 70a after molten steel has filled the mold until the main 70a and riser part 70b have been directionally solidified to form the final product ingot.

Graph G3.1 (power parameters) and Graph G3.2 (electromagnetic stir parameters) in FIG. 5(a) apply to an Example 3 ingot solidification process from the start of the directional solidification of the main part 70a after molten steel has filled the mold until the lower half 90' of main part 70a has solidified as illustrated in FIG. 2(b).

Graph G3.3 (power parameters) and Graph G3.4 (electromagnetic stir parameters) in FIG. 5(b) (Half Solidification process curves) apply to an Example 3 ingot solidification process after half the main part 70a has solidified until the entire ingot has solidified.

For Example 3 in FIG. 5(a) dashed solidification process line C1 was selected for variable power and stirring parameters from the start of the directional solidification of the main part 70a until the main part 70a has solidified. From process dashed line C1 in FIG. 5(a), VP/VF power supply PS outputs 7,834.7 amperes at 1.1296 kV and a frequency of 1 kHz resulting in electromagnetic stir characteristics of typical molten steel speed of 0.216 meters per second (m/s) and a Lorentz repelling force of 86.2 kilograms (kg).

For Example 3 in FIG. 5(b) (Half Solidification process curves) dashed solidification process line C2 was selected for variable power and stirring parameters from after half of the main part 70a has solidified until the remainder of the main part 70a and the riser part 70b has solidified. From process dashed line C2 in FIG. 5(b), VP/VF power supply PS outputs are adjusted to 7,022.1 amperes at 1.5135 kV and a frequency of 1.5 kHz resulting in electromagnetic stir characteristics of typical molten steel speed of 0.16 m/s and a Lorentz repelling force of 70 kilograms (kg).

EXAMPLE 4

Figure 6A:
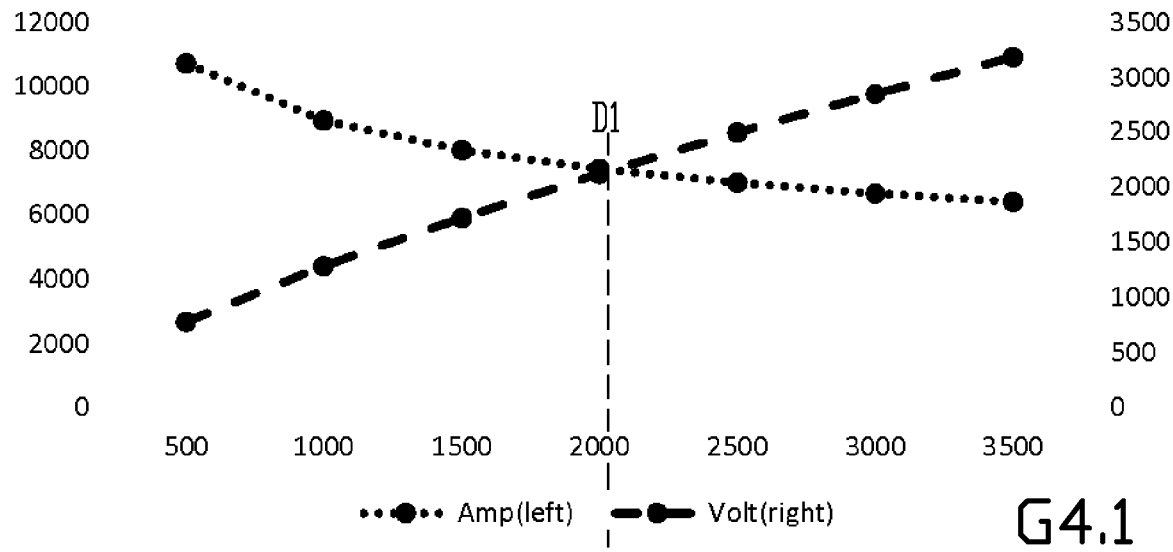
FIG. 6(a) and FIG. 6(b) are parametric models of a coordinately selectable range of voltage and current (power) values and frequency values as outputs from a variable power and variable frequency power source to an electric induction heating coil in one example of the present invention in producing a large steel 150 metric ton ingot with a nominal 350 kW induced power from the power source.
Figure 6A:
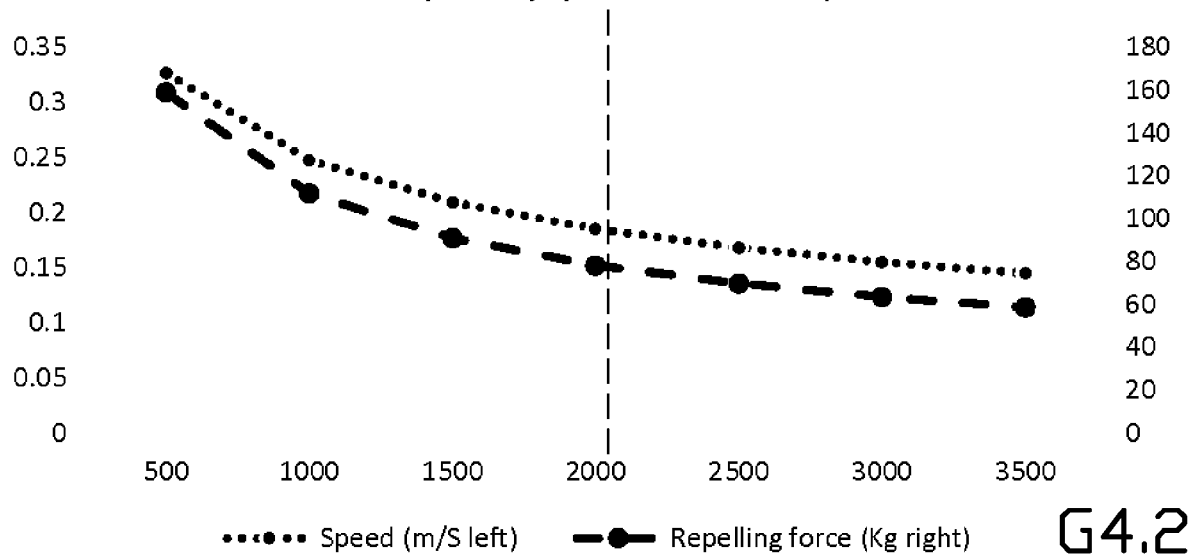
Figure 6B:
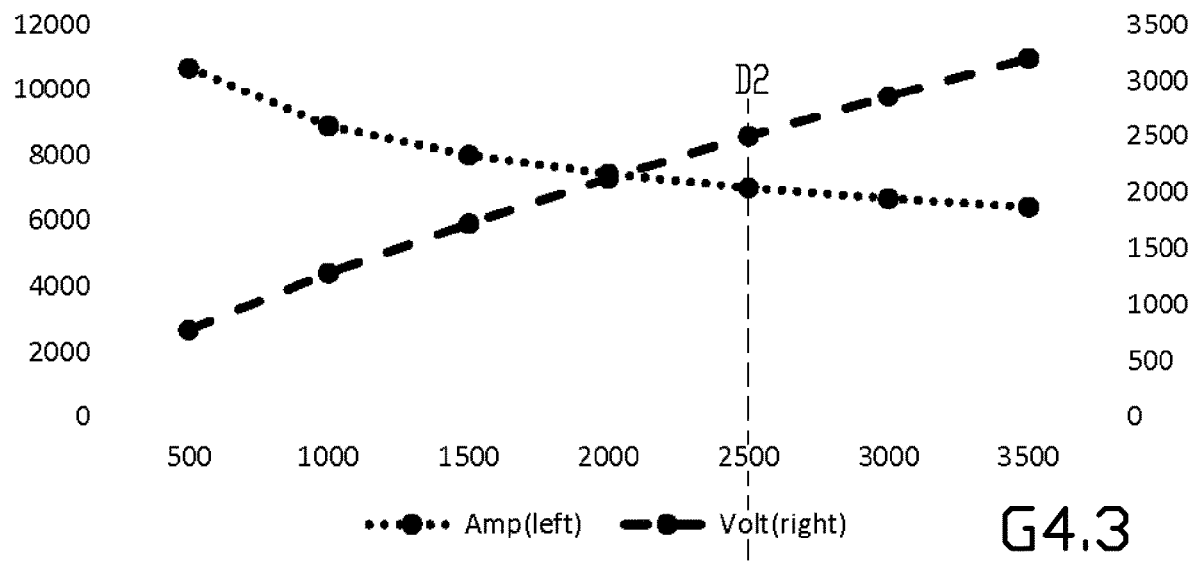
Figure 6B:
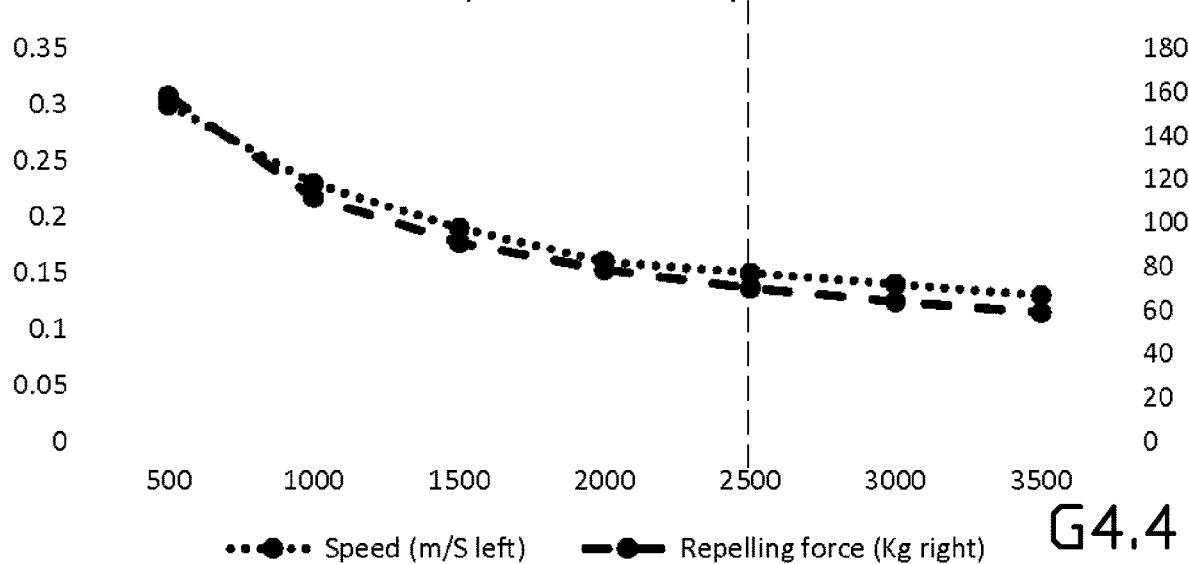

Example 4 is illustrated graphically in FIG. 6(a) and FIG. 6(b) for a 150 mt steel ingot casting where the magnitude of power induced over the top surface of the riser part 70b from the energized induction coil of the electric induction heating device 14 is maintained at a nominal 325 kW from the start of the directional solidification of the main part 70a after molten steel has filled the mold until the main part 70a and riser part 70b have been directionally solidified to form the final product ingot.

Figure 2C:
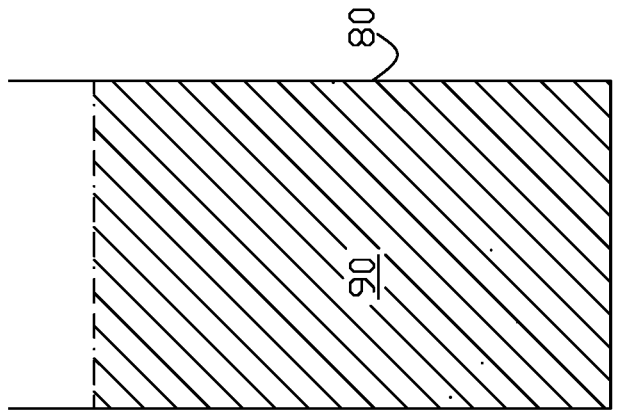
FIG. 2(c) is a diagrammatic representation of when all the molten steel has solidified.

Graph G4.1 (power parameters) and Graph G4.2 (electromagnetic stir parameters) in FIG. 6(a) apply to an Example 4 ingot solidification process from the start of the directional solidification of the main part 70a after molten steel has filled the mold until half the lower half 90' of the main part 70a has solidified as illustrated in FIG. 2(c).

Graph G4.3 (power parameters) and Graph G4.4 (electromagnetic stir parameters) in FIG. 6(b) (Half Solidification process curves) apply to an Example 4 ingot solidification process after half the main part 70a has solidified until the entire ingot has solidified.

For Example 4 in FIG. 6(a) dashed solidification process line D1 was selected for variable power and stirring parameters from the start of the directional solidification of the main part 70a until half the main part has solidified. From process dashed line D1 in FIG. 6(a), VP/VF power supply PS outputs 7,428.2 amperes at 2.1229 kV and a frequency of 2 kHz resulting in electromagnetic stir characteristics of typical molten steel speed of 0.185 meters per second (m/s) and a Lorentz repelling force of 78.3 kilograms (kg).

For Example 4 in FIG. 6(b) (Half Solidification process curves) dashed solidification process line D2 was selected for variable power and stirring parameters from after half the main body part 70a has solidified until the remainder of the main part 70a and the riser part 70b has solidified. From process dashed line D2 in FIG. 6(b), VP/VF power supply PS outputs are adjusted to 7,010.0 amperes at 2.5041 kV and a frequency of 2.5 kHz resulting in electromagnetic stir characteristics of typical molten steel speed of 0.15 m/s and a Lorentz repelling force of 70.3 kilograms (kg).

As exhibited in the above examples, the 150 mt ingot has a larger top surface area of melt and utilizes a bigger induction coil in the electric induction heating device than the 100 mt ingot. However, the total power requirement of the larger 150 mt ingot casting is less than that of the 100 mt ingot casting since electric power efficiency increases more than the top surface area.

In some embodiments of the invention if less stirring is preferred, for example, due to concern of non-metallic inclusions migrating to the main part, a higher frequency is selected with coordinated changes in voltage and current outputs from VP/VF power source PS. For a given melting power, melt flow velocity is inversely proportional to the square root of frequency. If the frequency is increased from 1000 Hz to 3000 Hz, the velocity will reduce 1.732 times.

As exhibited in the above examples, in some embodiments of the invention variable frequency supplied by the VP/VF power source PS is increased coordinately with increasing voltage and decreasing current.

The induced power and electromagnetic stirring force concentrate near surface. They are not affected by melt depth. However, the flow velocity and the size of each eddy are affected by melt depth.

Most of the induced heat power and electromagnetic stirring force are produced within two times of the reference depth, the value determined by the frequency of the alternating electric current. They are not affected by melt depth until the solidification line moves into the level of two times of reference depth. However, the melt flow velocity and the size of each eddy are affected by melt depth noticeably.

Through application of the present invention, the lower end of the mold is cooled faster and the cooling of the upper end of the mold is delayed, and as a result, it is possible to manufacture a high quality steel ingot product having less solidification defects in the cast product. In addition, it is possible to manufacture high-quality ingot products through precise temperature control without introducing impurities into the ingots through coordinated control of applied variable power and variable frequency.

Although the preferred embodiments of the present invention have been disclosed for illustrative purposes, the present invention is not limited to the construction and operation of those embodiments. In addition, those skilled in the art can understand that various changes and modifications can be made therein without departing from the subject matters of the disclosure.

Thus, such changes and modifications fall within the spirit and scope of the disclosure.

The invention claimed is:

1. A system for producing a large steel ingot by a solidification of a molten steel in a casting mold, the system comprising:
  a casting ingot for containing the molten steel, the molten steel forming a riser part of the molten steel and a main part of the molten steel disposed below the riser part in the casting mold;
  an electric induction heating coil positioned within the casting mold parallel and proximate to a top surface area of the molten steel in the casting mold;
  wherein an entirety of the electric induction heating coil is suspended at an offset distance over the top surface area of the molten steel;
  an electric power source configured for continuous supply of a variable power output and a variable frequency output to the electric induction heating coil, the variable power output and the variable frequency output simultaneously adjustable over a power range and a frequency range to supply an induced heating energy and a stirring force to maintain the molten steel in a molten state in the riser part until after the molten steel in the main part has solidified;
  wherein the induced heating energy supplied by the electric power source to the electric induction heating coil is maintained consistently at a nominal induced power.

2. The system of claim 1 wherein the electric induction heating coil comprises a flat spirally-wound induction coil, wherein each turn of the flat spirally-wound induction coil is coplanar defining a pancake-shaped heating coil.

3. The system of claim 2 wherein the flat spirally-wound induction coil is at least partially encased in a refractory.

4. The system of claim 2 wherein the flat spirally-wound induction coil is fully encased in a refractory.

5. The system of claim 1 wherein the variable power output is provided by a variable voltage controller.

6. The system of claim 1 wherein the variable power output is provided by a variable voltage and a variable current controller.

7. The system of claim 1 further comprising a raising and lowering apparatus configured to raise or lower the electric induction heating coil over the top surface area of the molten steel to selectively increase and decrease the offset distance, respectively.

8. The system of claim 1 further comprising a Human Machine Interface for storing variable power output values and variable frequency output values of the electric power source for a future large ingot casting process.

9. The system of claim 1 wherein the variable frequency output is increased coordinately with increasing voltage and decreasing current.

10. The system of claim 1 wherein the casting mold comprises a top mold section and a bottom mold section, the top mold section covering the bottom mold section containing the molten steel to form an entirely enclosed interior mold volume.

11. A method of producing a large steel ingot by solidifying a molten steel supplied to a casting mold, the molten steel forming a riser part of the molten steel over a main part of the molten steel, the method comprising:

positioning an electric induction heating coil within the casting mold over a top surface area of the molten steel;

supplying continuously a variable power magnitude and a variable frequency to the electric induction heating coil;

selecting a directional solidification process relative to each of a size of the large steel ingot, a shape of the large steel ingot, and a chemical composition of the molten steel, the directional solidification process comprising a range of solidification power magnitude and solidification frequency parameters over a process duration;

adjusting simultaneously the variable power magnitude and the variable frequency supplied to the electric induction heating coil coordinately over the process duration to match the solidification power magnitude and the solidification frequency parameters of the selected directional solidification process; and wherein the solidification power magnitude and the solidification frequency parameters are configured to maintain an induced power from the electric induction heating coil at a nominal induced power level from when the molten steel in the main part is in a molten state until at least the main part has solidified and such that the molten steel in the riser part is maintained in the molten state until after a lower main body part has solidified.

12. The method of claim 11 further comprising adjusting the variable frequency supplied to the electric induction heating coil for migration of one or more inclusions from the main part to the riser part.

13. The method of claim 11 wherein the variable frequency is adjusted to limit a defined depth of current penetration to the riser part.

14. The method of claim 11 wherein the variable power magnitude is controlled by adjusting a height of the electric induction heating coil over the top surface area of the molten steel.

15. The method of claim 11 wherein adjusting the variable power magnitude comprises adjusting a supplied voltage and a supplied current to the electric induction heating coil by a scale of a multiple of 10 kilowatts per square meter of the top surface area of the molten steel.

16. The method of claim 11 wherein adjusting the variable frequency comprises controlling an electromagnetic stirring force for a melt flow stirring pattern and speed in the molten steel.

17. The method of claim 11 further comprising adding a heat generating material and a thermally insulating material to the top surface area prior to positioning the electric induction heating coil over the top surface area.

18. A method of producing a large steel ingot by solidifying a molten steel supplied to a casting mold, the molten steel forming an upper riser part of the molten steel over a lower main part of the molten steel, the method comprising:

positioning an electric induction heating coil over a top surface area of the molten steel;

supplying continuously a variable power magnitude and a variable frequency to the electric induction heating coil;

initially adjusting a supplied voltage and a supplied current to the electric induction heating coil by a scale of a multiple of 10 kilowatts per square meter of the top surface area of the molten steel; and adjusting simultaneously the variable power magnitude and the variable frequency supplied to the electric induction heating coil coordinately to maintain an induced power from the electric induction heating coil at a nominal induced power level from when the molten steel in the main part is in a molten state until at least the main part has solidified and such that the molten steel in the riser part is maintained in the molten state until after a lower main body part has solidified.

19. The method of claim 18 further comprising controlling the variable power magnitude by adjusting a height of the electric induction heating coil over the top surface area of the molten steel.

20. The method of claim 18 further comprising constructing and storing a parametric model of the variable power magnitude and the variable frequency from a start of solidification to an end of solidification, wherein the parametric model is associated with the casting mold and a particular alloy of the molten steel.

* * * * *